US009219598B2

(12) United States Patent
Blon et al.

(10) Patent No.: US 9,219,598 B2
(45) Date of Patent: Dec. 22, 2015

(54) CIRCUIT ARRANGEMENT AND METHOD FOR TRANSMITTING SIGNALS

(71) Applicant: SILICON LINE GMBH, Munich (DE)

(72) Inventors: Thomas Blon, Munich (DE); Thomas Suttorp, Munich (DE); Holger Hoeltke, Munich (DE)

(73) Assignee: SILICON LINE GMBH, Munich (DE)

( * ) Notice: Subject to any disclaimer, the term of this patent is extended or adjusted under 35 U.S.C. 154(b) by 0 days.

(21) Appl. No.: 14/181,414

(22) Filed: Feb. 14, 2014

(65) Prior Publication Data

US 2015/0043690 A1 Feb. 12, 2015

Related U.S. Application Data

(63) Continuation of application No. PCT/DE2012/200051, filed on Aug. 16, 2012.

(30) Foreign Application Priority Data

Aug. 16, 2011 (DE) .......................... 10 2011 052 760

(51) Int. Cl.
H04L 7/00 (2006.01)
H04L 7/10 (2006.01)
H04B 1/04 (2006.01)
(52) U.S. Cl.
CPC ................ *H04L 7/0008* (2013.01); *H04B 1/04* (2013.01); *H04L 7/10* (2013.01)

(58) Field of Classification Search
USPC .......................... 375/295, 259, 299, 288, 354
See application file for complete search history.

(56) References Cited

U.S. PATENT DOCUMENTS

| 5,968,179 | A | 10/1999 | Barkey et al. | |
| 7,587,537 | B1 * | 9/2009 | Burney | 710/71 |
| 2004/0156398 | A1 * | 8/2004 | Abel et al. | 370/516 |
| 2010/0316099 | A1 * | 12/2010 | Sugita et al. | 375/219 |

OTHER PUBLICATIONS

"SL83014 by Silicon Line GmbH", Mar. 3, 2011, URL:http//www.silicon-line.com/SL83014.htm, XP055057663.
"MIPI Alliance Specification for D-PHY", Sep. 22, 2009, URL:http//www.mipi.org/specifications/physical-layer.
P. Dartnell et al., "Serdes Framer Interface Level 5 (SFI-5): Implementation Agreement for 40Gb/s Interface for Physical Layer Devices (OIF-SFI5-01.01)", Optical Internetworking Forum (OIF), URL:http//www.oiforum.com/public/documents/OIF-SFI5-01.0.pdf.
Gerrit Den Besten et al., "D-PHY Tuturial", Dec. 31, 2005, URL:http://www.mipi.org.
International Search Report; PCT/DE2012/200051; Apr. 11, 2013.

* cited by examiner

*Primary Examiner* — Siu Lee
(74) *Attorney, Agent, or Firm* — Studebaker & Brackett PC

(57) ABSTRACT

On the basis
of single-ended signals based on logic levels, and
of differential, in particular common-mode-based, signals,
a circuit arrangement and a corresponding method are proposed, in which a serialized signal transmission is always performed in an error-free and stable manner.

14 Claims, 5 Drawing Sheets

CIRCUIT ARRANGEMENT AND METHOD FOR TRANSMITTING SIGNALS

CROSS-REFERENCE TO RELATED APPLICATIONS

This application is a continuation of international (WO) patent application no. PCT/DE2012/200051, filed 16 Aug. 2012, which claims the priority of German (DE) patent application no. 10 2011 052 760.5, filed 16 Aug. 2011, the contents of each being hereby incorporated herein by reference.

FIELD OF THE INVENTION

The present invention relates to a circuit arrangement and to a method for transmitting both single-ended logic-level-based data signals and clock signals, and differential, in particular common-mode-based, data signals and clock signals.

BACKGROUND OF THE INVENTION

The bit transmission layer or physical layer (PHY) is the bottom layer in the O[pen]S[ystems]I[nterconnection] layer model, also called OSI reference model and denotes a layer model of the International Standards Organisation (ISO) which in turn serves as a design basis for communication protocols in computer networks.

The physical layer (PHY) is responsible for Combining, F[orward]E[rror]C[orrection], modulation, power control, spreading (C[ode]D[ivision]M[ultiple]A[ccess]) and the like and knows neither data nor applications, only zeros and ones. PHY makes logical channels (transport channels for U[niversal]M[obile]T[elecommunications]S[ystem]) available to the security layer (D[ata]L[ink]L[ayer]) above it, in particular to a partial layer called M[edia]A[ccess]C[ontrol] Layer.

In principle D-PHY provides a flexible, low-cost and quick serial interface for communication links between components within a mobile device.

As illustrated in FIG. 4A, in modern mobile phones a data source, for example an application processor, provides image data as D-PHY signals to the M[obile]I[ndustry]P[rocessor]I[nterface]-D[isplay]S[erial]I[nterface] for display on a connected data sink, for example on a connected display. Also, a data sink such as an application processor, can receive, via a MIPI-C[amera]S[erial]I[nterface], image data in D-PHY format from a connected data source, such as from a connected camera.

A DSI or DSI-2 or CSI or CSI-2 or CSI-3 based on the D-PHY protocol comprises up to four differential data lines and a differential clock line, which electrically connect the application processor by means of a copper cable with the display and/or with the camera. The data rate per differential data line is up to 1.5 Gbps (Gigabit per second).

This conventional sending and receiving of the D-PHY-DSI signals or the D-PHY-CSI signals via one to four differential data signals and a differential clock line is illustrated by way of example in the D-PHY interface configuration of FIG. 4B by way of two data channels (=so called data lanes CH0+, CH0− and CH1+, CH1−) and a clock line (=so called clock lane CLK+, CLK−) between the modules of the master side (=data source, for example camera and/or application processor) and the modules of the slave side (=data sink, for example application processor and/or display unit).

In this context, as can be seen in FIG. 4A, up to ten copper lines are required for data transmission for each connected display or for each connected camera (for example four times two data lines and one time two clock lines).

In view of a desirable reduction in the number of lines consideration should be given to serialised signal transmission. Such serialisation is, however, conventionally prone to errors and frequently unstable.

OBJECTS AND SUMMARY OF THE INVENTION

Starting from the above-explained disadvantages and inadequacies as well as taking the outlined prior art into account the object of the present invention is to further develop a circuit arrangement of the above-mentioned type and a method of the above-mentioned type in such a way that an efficient serialised signal transmission is always performed in an error-free and stable manner.

This object is achieved by a circuit arrangement according to the invention with the herein described features and by a method according to the invention with the herein described features. Advantageous embodiments and expedient developments of the present invention are described above and below.

This object is achieved by a circuit arrangement for transmitting both
  single-ended logic-level-based data signals and clock signals, and
  differential, in particular common-mode-based, data signals and clock signals,
in the form of at least one serialised common signal stream between at least one transmission arrangement assignable to at least one data source and at least one receiving arrangement assignable to at least one data sink, wherein the data rate of the differential data signals and clock signals is different from the data rate of the single-ended, logic-level-based data signals and clock signals.

This object is further achieved by an embodiment of the circuit arrangement according to the invention, wherein the data rate of the differential data signals and clock signals is smaller than the data rate of the single-ended, logic-level-based data signals and clock signals.

This object is further achieved by an embodiment of the circuit arrangement according to the invention, wherein the transmission arrangement comprises:
  at least one input for the data signals and clock signals,
  at least one transmission interface logic downstream of the input for picking up the data signals and clock signals,
  at least one serialiser downstream of the transmission interface logic for generating the common signal stream,
  at least one clock generator provided downstream of at least one clock module of the transmission interface logic, upstream of the serialiser and for generating at least one reference clock,
  at least one output driver downstream of the serialiser and
  at least one output downstream of the output driver for transmitting the common signal stream to the receiving arrangement.

This object is further achieved by an embodiment of the circuit arrangement according to the invention, wherein the clock generator is configured at least as a phase-locked-loop, in particular as an at least one clock multiplier unit.

This object is further achieved by an embodiment of the circuit arrangement according to the invention, wherein the serialiser comprises:
  at least one framer downstream of the transmission interface logic for generating at least one frame recognisable in the receiving arrangement for the common signal stream as well as
  at least one multiplexer downstream of the framer for generating the common signal stream.

This object is further achieved by an embodiment of the circuit arrangement according to the invention, wherein both the single-ended, logic-level-based data signals and the differential data signals can be applied to the framer and in that the framer, by means of at least one coder, in particular by means of at least one 5b/6b coder block, embeds the differential data signals in the stream of the single-ended, logic-level-based data signals.

This object is further achieved by an embodiment of the circuit arrangement according to the invention, wherein the multiplexer comprises:
at least one filter for differentiating between the differential data signals and/or clock signals, and the single-ended, logic-level-based data signals and/or clock signals, and
at least one further multiplexer to which the differential data signals and/or clock signals coming from the filter can be additionally applied.

This object is further achieved by an embodiment of the circuit arrangement according to the invention, wherein the receiving arrangement comprises:
at least one input for the common signal stream transmitted by the transmission arrangement,
at least one input amplifier for picking up the common signal stream,
at least one clock and data recovery unit for recovering the data signals and clock signals from the common signal stream,
at least one clock module of at least one receiving interface logic downstream of the clock and data recovery unit,
at least one deserialiser downstream of the clock and data recovery unit for re-parallelising the data and/or clock signals and for assigning the re-parallelised data and/or clock signals to the receiving interface logic and
at least one output downstream of the receiving interface logic for the data signals and clock signals.

This object is further achieved by an embodiment of the circuit arrangement according to the invention, wherein the deserialiser comprises:
at least one demultiplexer downstream of the clock and data recovery unit for re-parallelising the data and/or clock signals as well as
at least one deframer downstream of the demultiplexer for assigning the re-parallelised data and/or clock signals to the receiving interface logic.

This object is further achieved by an embodiment of the circuit arrangement according to the invention, wherein the deframer separates the differential data signals by means of at least one decoder, in particular by means of at least one 6b/5b decoder block, from the single-ended, logic-level-based data signals and assigns the re-parallelised data signals to the respective data lines.

This object is further achieved by an embodiment of the circuit arrangement according to the invention, wherein the common signal stream is transferable between the transmission arrangement and the receiving arrangement
via at least one optical medium, in particular via at least one optical waveguide, for example via at least one glass fibre and/or via at least one plastic fibre, and/or
via at least one electrical or galvanic, in particular one-bit-wide, link, in particular via at least one copper cable and/or via at least one electrical line, arranged e.g. on at least one printed circuit board.

This object is further achieved by a method for transmitting both
single-ended logic-level-based data signals and clock signals, and
differential, in particular common-mode-based, data and clock signals,
in the form of at least one serialised common signal stream between at least one transmission arrangement assignable to at least one data source and at least one receiving arrangement assignable to at least one data sink, wherein the data rate of the differential data and clock signals is different from the data rate of the single-ended, logic-level-based data and clock signals.

This object is further achieved by an embodiment of the method according to the invention, wherein the data rate of the differential data and clock signals is smaller than the data rate of the single-ended, logic-level-based data and clock signals.

This object is further achieved by an embodiment of the method according to the invention, wherein the common signal stream between the transmission arrangement and the receiving arrangement is transmitted
via at least one optical medium, in particular via at least one optical waveguide, for example via at least one glass fibre and/or via at least one plastic fibre, and/or
via at least one electrical or galvanic, in particular one-bit-wide, link, in particular via at least one copper cable and/or via at least one electrical line arranged on at least one printed circuit board.

This object is further achieved by a use of the circuit arrangement and/or of the method according to the invention during serial and/or bundled, in particular CSI protocol-based and/or CSI-2 protocol-based and/or CSI-3 protocol-based and/or DSI protocol-based and/or DSI-2 protocol-based transmission of both single-ended logic-level-based data and clock signals and differential, in particular common-mode-based, data and clock signals, in particular D-PHY data signals and D-PHY clock signals, for example up to 4-bit-wide MIPI-D-PHY data signals and MIPI-D-PHY clock signals, between at least one data source, in particular at least one e.g. high-resolution camera acting e.g. as an image source and/or at least one application processor, and at least one data sink, in particular at least one application processor and/or at least one e.g. high-resolution display unit and/or a display unit acting e.g. as an image sink, for example at least one display or at least one monitor.

A circuit arrangement and a method are thus proposed, by means of which
the single-ended L[ow]P[ower] data corresponding to signals based on logic levels and
the differential H[igh]S[peed] data corresponding to signals based in particular on common mode signals
are serialised to form a common signal stream.

With a transmission path of this kind with common serialised signal stream the H[igh]S[peed]-/L[ow]P[ower] data is bundled by at least one transmission building block (=transmission arrangement) essentially comprising at least one multiplexer and transmitted as a common serialised data stream to a receiving building block (=receiving arrangement).

This receiving arrangement essentially comprising at least one demultiplexer debundles the serial data and again outputs it in original form as H[igh]S[peed]-/L[ow]P[ower] data. The CL[oc]K applied to the transmission arrangement serves as clock reference for the multiplexer and is embedded in the common serial signal stream. The receiving arrangement regenerates this clock and re-outputs it as CL[oc]K.

Based on a situation, in which all data inputs carry H[igh]S[peed] data, the normal approach for data bundling consists in that the data is multiplexed and sent out as a serial data stream.

However in the M[obile]I[ndustry]P[rocessor]I[nterface]-D-PHY standard it has been agreed, that a return to the so-called L[ow]P[ower] transmission mode is signalled by means of voltage amplitudes, which lie outside the voltage levels used for the signalling of H[igh]S[peed] data.

These L[ow]P[ower] signal levels represent additional information which cannot, as explained above, be coded in the data space of the simply bundled serial data stream.

According to the invention it is proposed, to insert at least one further, in particular virtual lane, which exclusively contains L[ow]P[ower] data and which is entered into the multiplexer in parallel to the H[igh]S[peed] lanes. This makes it possible to communicate L[ow]P[ower] states without having to expand the coding space for H[igh]S[peed] data on the inputs of the multiplexer provided for this.

This lane, in particular virtual lane, which could also be called telegram lane, can also be used for transporting other system-relevant information; for example, it could be used to transmit the information that the serial data link will shortly be cut.

The present invention can be typically applied during serial and/or bundled, in particular CSI-protocol-based and/or CSI-2-protocol-based and/or CSI-3-protocol-based and/or DSI-protocol-based and/or DSI-2-protocol-based transmission of both single-ended logic-level-based data signals and clock signals and differential, in particular common-mode-based data signals and clock signals, in particular D-PHY data signals or D-PHY clock signals, for example one-to-four-bit wide MIPI-D-PHY data signals and MIPI-D-PHY clock signals, between at least one data source, in particular at least for example a high-resolution camera and/or a camera acting as an image source and/or at least one application processor, and at least one data sink, in particular at least one application processor and/or at least one high-resolution display unit or a display unit acting for example as an image sink, for example at least one display or at least one monitor.

BRIEF DESCRIPTION OF THE DRAWINGS

As already discussed above, there are various possibilities for embodying and further developing the teaching of the present invention in an advantageous manner. For this purpose, on the one hand reference is made to the explanations above and to the dependent claims, and on the other hand further embodiments, features and advantages of the present invention are explained in greater detail below, inter alia by way of the exemplary embodiments illustrated by FIG. 1A to FIG. 3.

It is shown in.

Like or similar embodiments, elements or features are provided with identical reference numerals in FIG. 1A to FIG. 4B.

DETAILED DESCRIPTION OF THE INVENTION

Figure 1A:
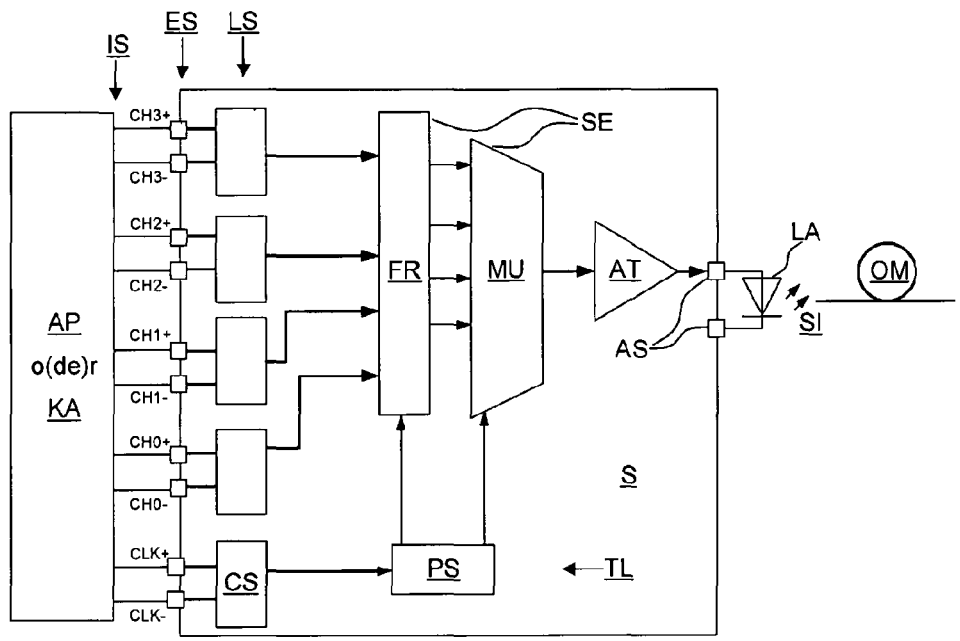
FIG. 1A in a conceptual schematic illustration an embodiment of the first part, i.e. the transmission arrangement of a circuit arrangement configured according to the present invention, which operates according to the method of the present invention.
Figure 2A:
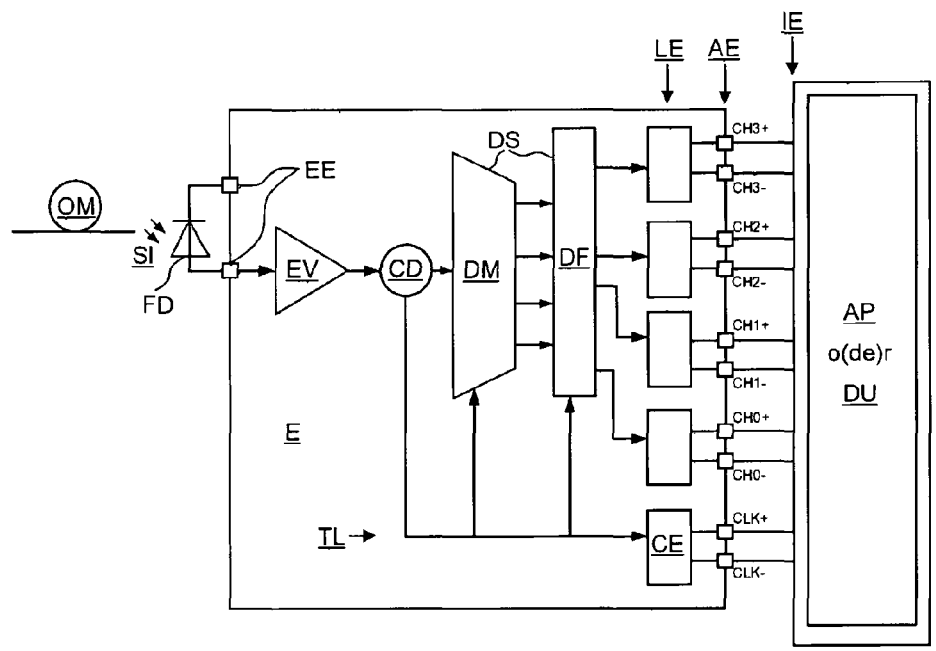
FIG. 2A in a conceptual schematic illustration an embodiment of the second part, i.e. the receiving arrangement of a circuit arrangement configured according to the present invention, which operates according to the method of the present invention.

In principle it is possible,
by means of the embodiment shown in FIG. 1A of a transmission arrangement S according to the present invention and
by means of an embodiment shown in FIG. 2A of a receiving arrangement E according to the present invention,
which results in a circuit arrangement A (see FIG. 1A, FIG. 2A) according to the present invention (in terms of the present invention, it is possible, to realise and to operate the transmission arrangement S and the receiving arrangement E independently of each other), to realise and to operate a cable-based link
which has been multiplexed and thus serialised on an optical basis, in particular on the basis of at least one optical medium, for example on the basis of an optical waveguide OM (see detail illustrations in FIG. 1A, FIG. 2A), such as on the basis of at least one glass fibre and/or on the basis of at least one plastic fibre and/or
which has not been multiplexed on an electrical or galvanic basis, in particular on the basis of at least one electrical or galvanic link, for example on the basis of at least one copper cable and/or on the basis of at least one electrical line such as arranged on at least a printed circuit board.

FIG. 1A shows an embodiment of the principal construction of a transmission arrangement S for connection to a D[isplay]S[erial]I[nterface] data transmission interface IS or a C[amera]S[erial]I[nterface]-data transmission interface IS.

The image data generated in the application processor AP or in the camera KA are made available on four data lines or channels CH0+, CH0−, CH1+, CH1−, CH2+, CH2−, CH3+, CH3− as D-PHY signals at the up-to-four-bit-wide data transmission interface IS together with the D-PHY correct clock signals CLK+, CLK−.

The transmission arrangement S picks these signals up at an integrated Interface Logic LS, the blocks of which can prove that they have at least one state machine for correct interpretation of the D-PHY signals and for differentiating between high-frequency data streams (so-called H[igh]S[peed] data) and low-frequency data streams (so-called L[ow]S[peed] data).

A framer FR following in the transmission arrangement S (see also detail view in FIG. 1B) ensures D[irect]C[urrent] balancing of the input signal and generates a frame recognisable on the receiving side (see FIG. 2A), which allows the receiving arrangement E (see FIG. 2A) to re-assign the received data to the correct output data lines or output channels CH0+, CH0−, CH1+, CH1−, CH2+, CH2−, CH3+, CH3−.

Figure 1B:
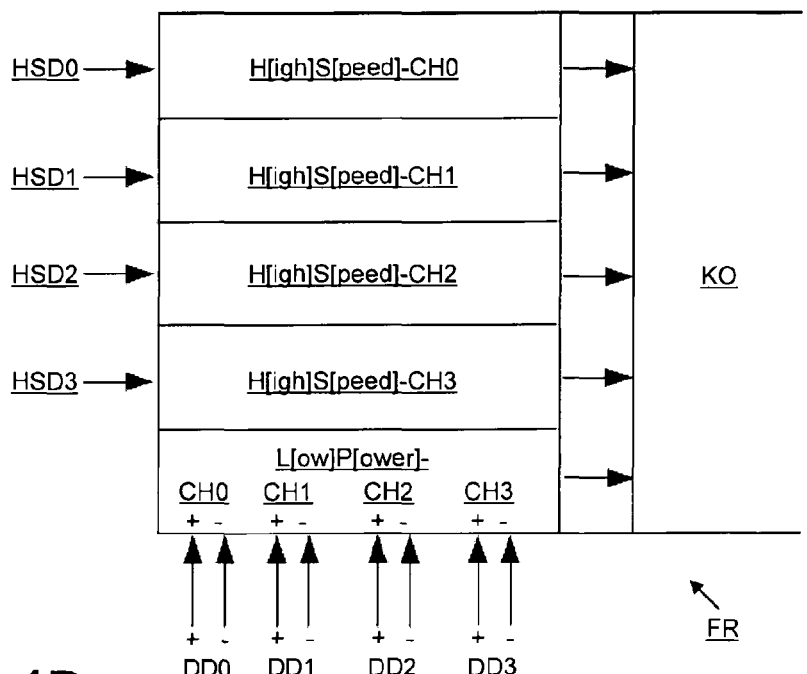
FIG. 1B in a conceptual schematic illustration a detail view of an embodiment of the framer of the transmission arrangement in FIG. 1A.

In detail both the logic-level-based single-ended data signals HSD0, HSD1, HSD2, HSD3 and the differential data signals DD0+, DD0−, DD1+, DD1−, DD2+, DD2−, DD3+, DD3− can be applied to the framer FR according to FIG. 1B. By means of its coder KO configured as a 5b/6b coding block the framer FR according to FIG. 1B embeds these differential data signals DD0+, DD0−, DD1+, DD1−, DD2+, DD2−, DD3+, DD3− into the stream of the single-ended logic-level-based data signals HSD0, HSD1, HSD2, HSD3.

A multiplexer MU, in particular H[igh]S[peed] Mux, adjoining the framer FR, uses a clock generator PS configured as a phase-locked-loop, in particular as a C[lock]M[ultiplier]U[nit], to generate the high-frequency serial or bundled transmission signal, which is made available at the output AS of the transmission arrangement S by means of an output driver AT. The framer FR and the multiplexer MU together form the serialiser SE.

The D-PHY clock signal provided via the clock port CLK+, CLK− and via the clock module CS of the interface logic LS by means of clock generator PS is used as (clock) reference for the serialiser SE, in particular for its multiplexer MU, and is embedded into the serial data stream, i.e. into the serialised output signal. This creates the common signal stream SI which is communicated to the receiving arrangement E (see FIG. 2A).

As can further be seen in FIG. 1A, the output driver AT is implemented as an integrated laser driver for driving at least one directly connected laser LA, in particular for driving at least one V[ertical]C[avity]S[urface]E[mitting]L[aserdiode].

FIG. 2A shows an embodiment for the principal construction of a receiving arrangement E for connection to a D[isplay]S[erial]I[nterface] data transmission interface IE or also a C[amera]S[erial]I[nterface] data transmission interface IE.

The serial or bundled data sent out by the transmission arrangement S (see FIG. 1A) is picked up via an input amplifier EV of the receiving arrangement E and supplied to an integrated clock or data recovery CD.

This integrated clock or data recovery CD regenerates the original D-PHY clock from the common signal stream SI, which is then made directly available again to the D[isplay]S[erial]I[nterface] or the C[amera]S[erial]I[nterface] via the clock module CE of the interface logic LE. The remaining serial data stream is debundled and parallelised via a demultiplexer DM and handed over to a deframer DF (see also detail in FIG. 2B), which in principle is the mirror image of framer FR according to FIG. 1B. The demultiplexer DM and deframer DF together form the deserialiser DS.

Figure 2B:
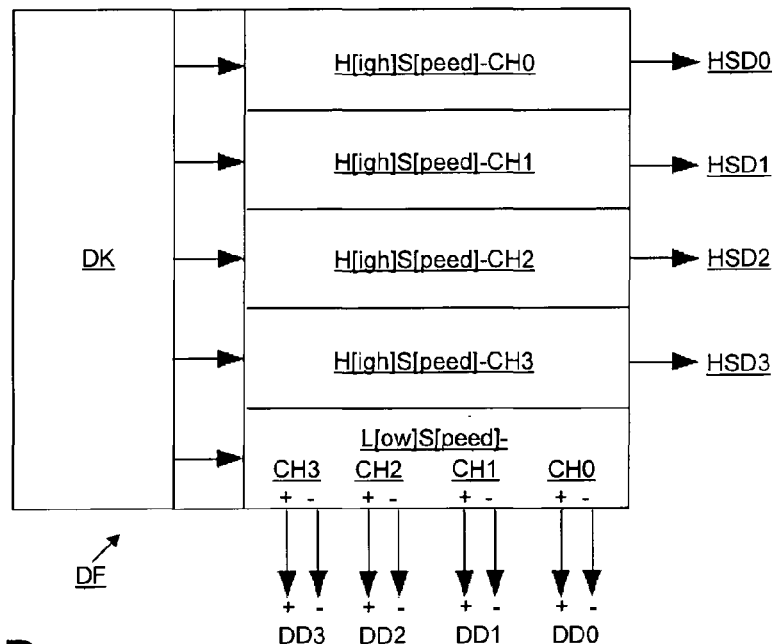
FIG. 2B in a conceptual schematic illustration a detail view of an embodiment of the deframer of the receiving arrangement of FIG. 2A.

In detail the deframer FR of FIG. 2B, by means of its decoder DK configured as a 6b/5b decoder block, can separate the differential data signals DD0+, DD0−, DD1+, DD1−, DD2+, DD2−, DD3+, DD3− from the single-ended, logic-level-based data signals HSD0, HSD1, HSD2, HSD3 and re-assign the re-parallelised data signals to the respectively applicable data lines CH0+, CH0−, CH1+, CH1−, CH2+, CH2−, CH3+, CH3−.

The interface logic blocks LE shown in the receiving arrangement E may comprise at least one state machine respectively for correct interpretation of the D-PHY logic signals and for differentiating between high-frequency data streams and low-frequency data streams.

As can also be seen in the illustration in FIG. 2A, the input amplifier EV is implemented as an integrated transimpedance amplifier, which allows a photo diode FD to be directly connected to the receiving arrangement E.

In this way, with regard to the circuit arrangement S, E (see FIG. 1A, FIG. 2A), it is possible according to the invention to realise and to operate the cable-based multiplexed link between the transmission arrangement S (see FIG. 1A) and the receiving arrangement E (see FIG. 2A) on an optical basis, i.e. by means of an optical waveguide OM configured e.g. in form of a glass fibre and/or in form of a plastic fibre.

Based on this situation, in which all data inputs ES carry H[igh]S[peed] data corresponding to single-ended, logic-level-based signals, the normal approach for data bundling would be to multiplex the data with the multiplexer MU according to FIG. 1A and to send it out as a serial signal stream SI.

Figure 3:
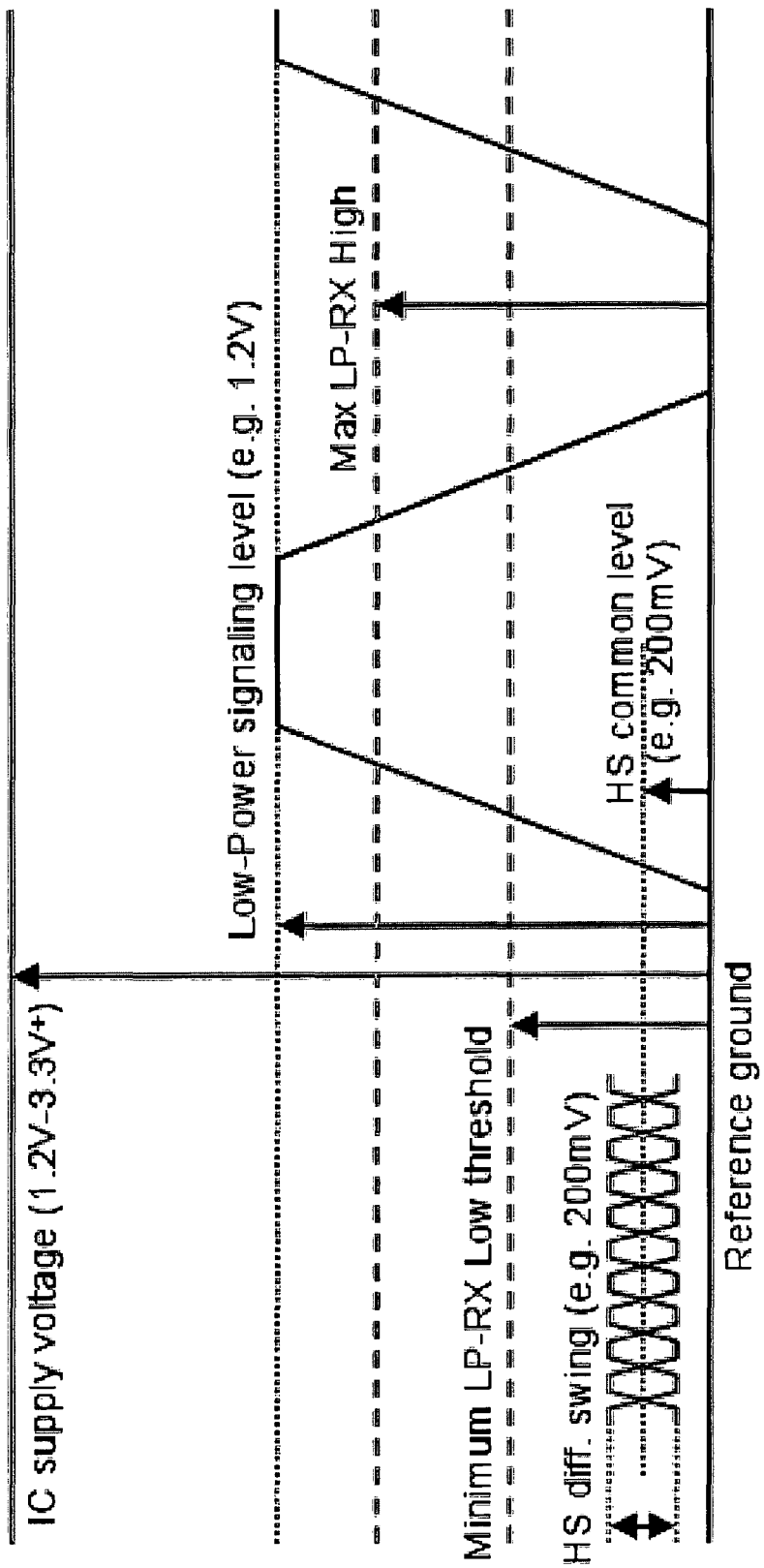
FIG. 3 in a diagrammatic illustration an embodiment of the respective voltage levels for H[igh]S[peed]-data transmission and for L[ow]P[ower] data transmission.
Figure 4A:
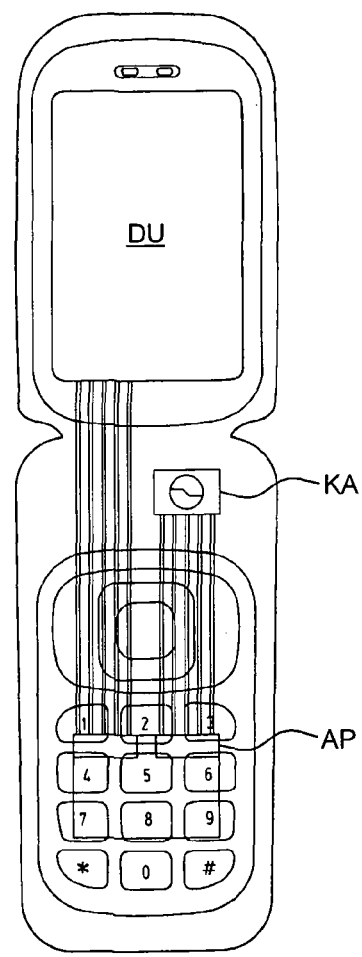
FIG. 4A in a conceptual schematic illustration an example of the arrangement from the prior art.
Figure 4B:
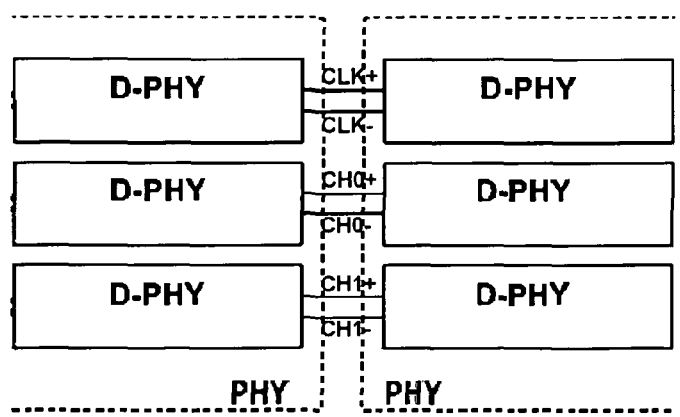
FIG. 4B in a conceptual schematic illustration an example of an interface configuration with two data channels and a clock line, on which the arrangement shown in FIG. 4A is based.

However, in the M[obile]I[ndustry]P[rocessor]I[nterface]-D-PHY standard it has been agreed that a return to the L[ow]P[ower] transmission mode corresponding to differential, in particular common-mode-based, signals is to be signalled by means of voltage amplitudes which lie outside the voltage levels used for the signalling of H[igh]S[peed] data as illustrated in FIG. 3.

These L[ow]P[ower] signal levels represent additional information which, as explained above, cannot be coded in the data space of the simply bundled serial signal stream SI.

Figure 1C:
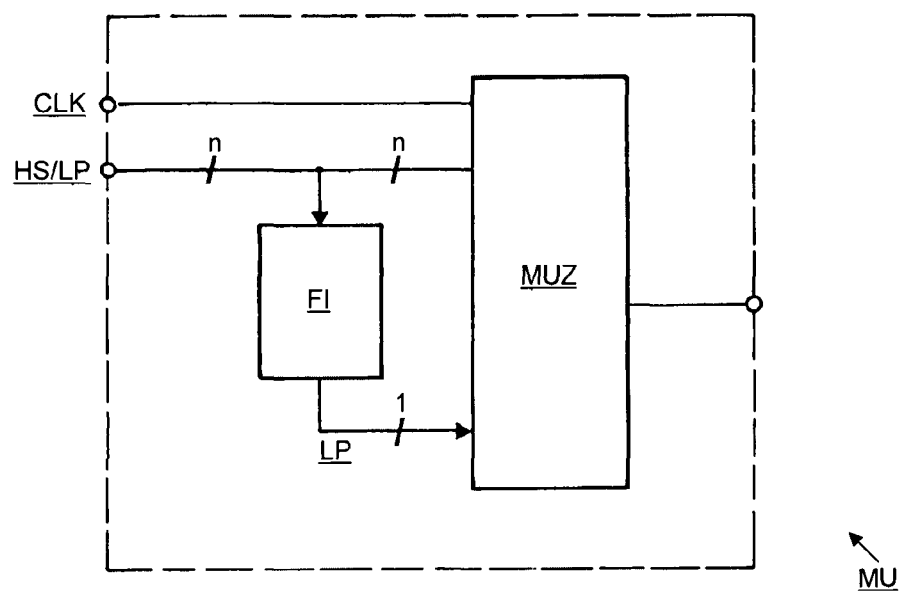
FIG. 1C in a conceptual schematic illustration an embodiment of the multiplexer of the transmission arrangement of FIG. 1A.

For this reason a further, in particular virtual lane according to FIG. 1C is introduced, which exclusively contains L[ow]P[ower] data and which is entered into the multiplexer MU in parallel to the H[igh]S[peed] lanes.

To this end at least one filter FI is arranged at the H[igh]S[peed]-/L[ow]P[ower] data input of the multiplexer MU, which can differentiate between L[ow]P[ower] data and H[igh]S[peed] data due to their specific voltage levels. This filter FI supplies the L[ow]P[ower] data gained in this way as a further input, so-to-speak as a virtual H[igh]S[peed] data lane to a further or additional multiplexer MUZ.

This lane can be called a telegram lane. An exemplary construction of the virtual telegram lane could look as follows:

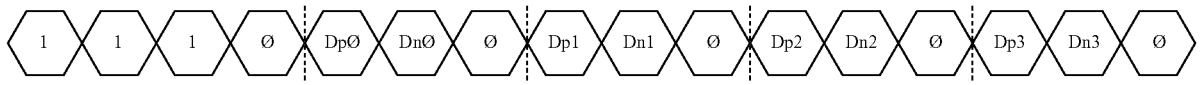

The sixteen bits of the virtual telegram lane are divided into initially a four-bit-long Sync-/Start sequence, which is used for effecting synchronisation on the receiving side E, and subsequently three bits each per L[ow]P[ower] datum.

Thus in the embodiment shown four lane inputs CH0+, CH0−, CH1+, CH1−, CH2+, CH2−, CH3+, CH3− are treated.

Due to the serialisation of the L[ow]P[ower] data upstream of the further or additional multiplexer MUZ these L[ow]P[ower] data is not transmitted with the same data rate as the H[igh]S[peed] data transmitted in parallel. In this MIPI-D-PHY system treated here as an example it is, at any rate, the case that the L[ow]P[ower] data has a much lower data rate than H[igh]S[peed] data.

The demultiplexer DM according to FIG. 2A can be constructed as a mirror image of the multiplexer MU according to FIG. 1C.

LIST OF REFERENCE NUMERALS

E receiving arrangement
S transmission arrangement
AE output of the receiving arrangement E
AP application processor
AS output of the transmission arrangement S
AT output driver, in particular laser driver
CD clock and data recovery unit
CE clock module of the receiving interface logic LE
CH0± first data line or first channel
CH1± second data line or second channel
CH2± third data line or third channel
CH3± fourth data line or fourth channel
CLK± clock line or clock channel
CS clock module of the transmitting interface logic LS
DD0± differential signal, in particular common-mode-based data signal on the first data line or the first channel CH0±
DD1± differential signal, in particular common-mode-based data signal on the second data line or the second channel CH1±
DD2± differential signal, in particular common-mode-based data signal on the third data line or the third channel CH2±
DD3± differential signal, in particular common-mode-based data signal on the fourth data line or the fourth channel CH3±
DF deframer
DK decoder, in particular 6b/5b-Decoderblock, of deframer DF
DM demultiplexer
DS deserialisation element or deserialiser
DU display unit
EE input of the receiving arrangement E
ES input of the transmission arrangement S
EV input amplifier, in particular transimpedance amplifier
FD photo diode
FI filter, in particular data filter, for example L[ow]P[ower] data filter
FR framer
HS High Speed
HSD0 single-ended logic-level-based data signal on the first data line or the first channel CH0±
HSD1 single-ended logic-level-based data signal on the second data line or the second channel CH1±
HSD2 single-ended logic-level-based data signal on the third data line or the third channel CH2±
HSD3 single-ended logic-level-based data signal on the fourth data line or the fourth channel CH3±
IE data-sink-related CSI and/or CSI-2 and/or CSI-3 and/or DSI and/or DSI-2 interface
IS data-source-related CSI and/or CSI-2 and/or CSI-3 and/or DSI and/or DSI-2 interface
KA camera
KO coder, in particular 5b/6 coder block of framer FR
LA laser
LE receiving interface logic
LP low power
LS transmitting interface logic
MU multiplexer
MUZ further or additional multiplexer in multiplexer MU
OM optical medium, in particular optical waveguide, e.g. glass fibre and/or plastic fibre
PS clock generator, in particular phase-locked-loop, for example clock multiplier unit
SE serialisation element or serialiser
SI common signal stream
TL clock line While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A circuit arrangement for transmitting both
    single-ended logic-level-based data signals and clock signals, and
    differential, in particular common-mode-based, data signals and clock signals,
    in the form of at least one serialized common signal stream between at least one transmission arrangement assignable to at least one data source and at least one receiving arrangement assignable to at least one data sink, wherein the data rate of the differential data signals and clock signals is different from the data rate of the single-ended, logic-level-based data signals and clock signals,
    wherein the circuit arrangement comprises at least one serializer and at least one clock generator.

2. The circuit arrangement according to claim 1, wherein the data rate of the differential data signals and clock signals is smaller than the data rate of the single-ended, logic-level-based data signals and clock signals.

3. The circuit arrangement according to claim 1, wherein the transmission arrangement comprises:
    at least one input for the data signals and clock signals,
    at least one transmission interface logic downstream of the input for picking up the data signals and clock signals,
    the at least one serializer downstream of the transmission interface logic for generating the common signal stream,
    the at least one clock generator provided downstream of at least one clock module of the transmission interface logic, upstream of the serializer and for generating at least one reference clock,
    at least one output driver downstream of the serializer and
    at least one output downstream of the output driver for transmitting the common signal stream to the receiving arrangement.

4. The circuit arrangement according to claim 3, wherein the clock generator is configured at least as a phase-locked-loop, in particular as an at least one clock multiplier unit.

5. The circuit arrangement according to claim 3, wherein the serializer comprises:
    at least one framer downstream of the transmission interface logic for generating at least one frame recognizable in the receiving arrangement for the common signal stream as well as
    at least one multiplexer downstream of the framer for generating the common signal stream.

6. The circuit arrangement according to claim 5, wherein both the single-ended, logic-level-based data signals and the differential data signals can be applied to the framer and in that the framer, by means of at least one coder, in particular by means of at least one 5b/6b coder block, embeds the differential data signals in the stream of the single-ended, logic-level-based data signals.

7. The circuit arrangement according to claim 5, wherein the multiplexer comprises:
    at least one filter for differentiating between the differential data signals and/or clock signals, and the single-ended, logic-level-based data signals and/or clock signals, and at least one further multiplexer to which the differential data signals and/or clock signals coming from the filter can be additionally applied.

8. The circuit arrangement according to claim 1, wherein the receiving arrangement comprises:
- at least one input for the common signal stream transmitted by the transmission arrangement,
- at least one input amplifier for picking up the common signal stream,
- at least one clock and data recovery unit for recovering the data signals and clock signals from the common signal stream,
- at least one clock module of at least one receiving interface logic downstream of the clock and data recovery unit,
- at least one deserializer downstream of the clock and data recovery unit for re-parallelizing the data and/or clock signals and for assigning the re-parallelized data and/or clock signals to the receiving interface logic and
- at least one output downstream of the receiving interface logic for the data signals and clock signals.

9. The circuit arrangement according to claim 8, wherein the deserializer comprises:
- at least one demultiplexer downstream of the clock and data recovery unit for re-parallelizing the data and/or clock signals as well as
- at least one deframer downstream of the demultiplexer for assigning the re-parallelized data and/or clock signals to the receiving interface logic.

10. The circuit arrangement according to claim 9, wherein the deframer separates the differential data signals by means of at least one decoder, in particular by means of at least one 6b/5b decoder block, from the single-ended, logic-level-based data signals and assigns the re-parallelized data signals to the respective data lines.

11. The circuit arrangement according to claim 1, wherein the common signal stream is transferable between the transmission arrangement and the receiving arrangement
- via at least one optical medium, or
- via at least one electrical or galvanic.

12. A method for transmitting both
- single-ended logic-level-based data signals and clock signals, and
- differential, in particular common-mode-based, data and clock signals,
- in the form of at least one serialized common signal stream between at least one transmission arrangement assignable to at least one data source and at least one receiving arrangement assignable to at least one data sink, wherein the data rate of the differential data and clock signals is different from the data rate of the single-ended, logic-level-based data and clock signals.

13. The method according to claim 12, wherein the data rate of the differential data and clock signals is smaller than the data rate of the single-ended, logic-level-based data and clock signals.

14. The method according to claim 12, wherein the common signal stream between the transmission arrangement and the receiving arrangement is transmitted
- via at least one optical medium, or
- via at least one electrical or galvanic.

* * * * *